April 30, 1968 W. G. ABRAHAM 3,381,164
TWO-CAVITY KLYSTRON OSCILLATORS HAVING CAPACITIVELY
TUNED COUPLING IRIS BETWEEN THE CAVITIES
Filed Nov. 17, 1964 2 Sheets-Sheet 1
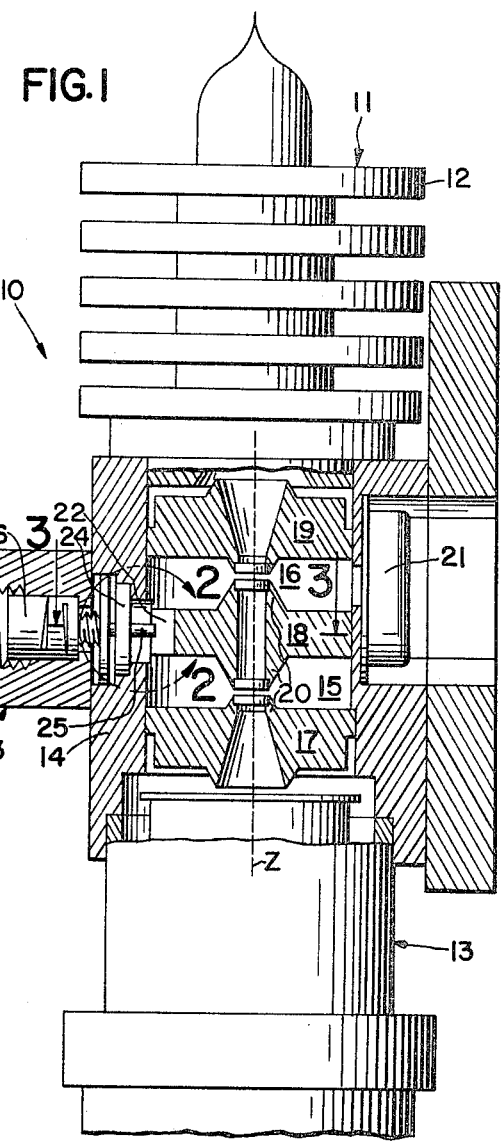
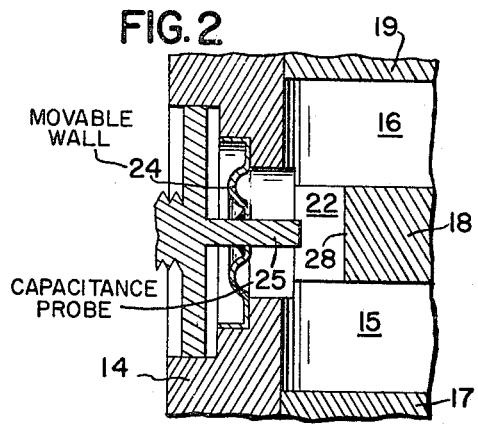
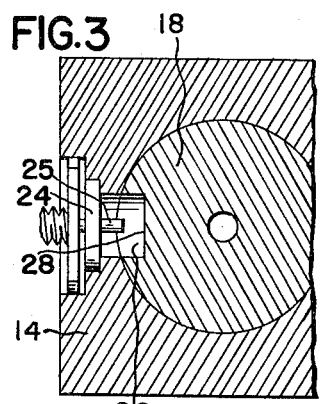
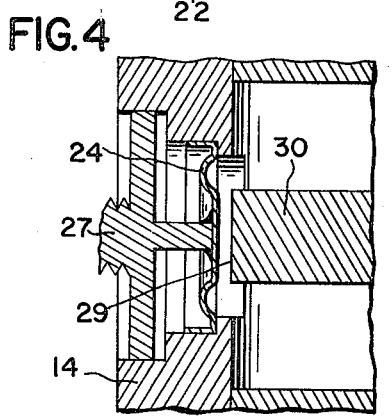
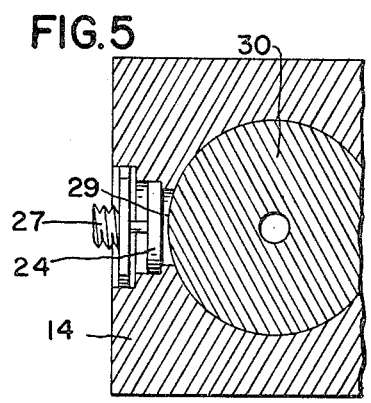
INVENTOR.
WAYNE G. ABRAHAM
BY Harry E. Aine
ATTORNEY

INVENTOR.
WAYNE G. ABRAHAM
BY
ATTORNEY

United States Patent Office 3,381,164
Patented Apr. 30, 1968

3,381,164
TWO-CAVITY KLYSTRON OSCILLATORS HAVING CAPACITIVELY TUNED COUPLING IRIS BETWEEN THE CAVITIES
Wayne G. Abraham, Palo Alto, Calif., assignor to Varian Associates, Palo Alto, Calif., a corporation of California
Filed Nov. 17, 1964, Ser. No. 411,808
7 Claims. (Cl. 315—5.48)

ABSTRACT OF THE DISCLOSURE

A tunable iris designed to provide coupling between the cavities of a two-cavity klystron tube. The iris is capacitively tuned by moving a flexible diaphragm which forms one of the walls of the iris. The iris capacitance may be increased either by providing a capacitive probe extending from the diaphragm toward an opposite wall or by making the opposite wall convexly curved toward the flexible diaphragm.

---

This invention relates in general to the field of high frequency electron discharge devices and more particularly to a novel two-cavity klystron oscillator.

As sign requirements in the field of klystron oscillators become more and more stringent such that the allowable variations in modulation sensitivity for such oscillators as well as other parameters thereof such as allowable variations in $P_{out}$ (power out) vs. $V_o$ (beam voltage) characteristics are increasingly made tighter and tighter by the system user, the tube designer in this particular field must seek novel solutions to provide klystron oscillators within the design specifications while limiting costs to a minimum. An exemplary design requirement in the field of two-cavity klystron oscillators is what may be termed a "flat top mode" design.

A flat top mode tube may be defined as one wherein the power output is somewhat independent of frequency. Alternatively, a flat top tube may be defined as one wherein a power output versus beam voltage characteristic is relatively flat for a given operating mode, thus providing effective isolation of $P_{out}$ with respect to power supply fluctuations over an increased beam voltage $V_o$ range. Another way of defining a flat top mode tube is a comparison of the relative frequency deviation versus relative transit angle characteristic for the given operating mode. A linear characteristic would be considered a flat top mode tube. In each of these cases of flat top mode tubes mentioned above, namely, the relatively flat $P_{out}$ vs. $V_o$ characteristic type and the reduced modulation sensitivity type, the coupling requirements are, practically speaking, identical.

Such a flat top mode tube may be designed, using prior art techniques, by extremely careful control of the coupling aperture or iris physical parameters between the two cavities in a two-cavity klystron oscillator. This is done conventionally by extremely precise machining operations which, of course, increase the per unit cost. Furthermore, since minute deviations in each individual tube may require individual machining of each coupling hole after tube processing in order to provide the required coupling, it is an extremely costly procedure per conventional techniques, to obtain a flat top mode tube.

The present invention, through the utilization of a tunable coupling iris between the two adjacent cavities in a two-cavity klystron oscillator provides an easy means of adjustment of the coupling between said cavities for obtaining a flat top mode characteristic.

The present invention further provides an improved method of adjusting the coupling between the two cavities of a two-cavity klystron oscillator by utilizing a tunable re-entrant form of coupling iris therebetween which does not substantially vary the resonant frequencies of the individual cavities.

A few of the more obvious beneficial advantages to be derived from the tunable coupling iris of the present invention are: greater flexibility of design, reduced critical design tolerances for a feedback coupling iris, flexibility in power supply design criteria for two-cavity klystron tubes while maintaining essentially flat top mode characteristic operation.

It is therefore an object of the present invention to provide a multi-cavity klystron oscillator with tunable internal coupling iris means therein.

A feature of the present invention is the provision of a multi-cavity klystron oscillator having a tunable coupling iris between the cavities thereof which varies the coupling between the cavities without substantially changing the resonant frequency of each of the coupled cavities.

Other features and advantages of the present invention will become more apparent upon a perusal of the following specification taken in conjunction with the following drawings wherein:

FIG. 1 is an elevational view partially sectioned of a two-cavity klystron oscillator incorporating the novel tunable coupling iris arrangement of the present invention;

FIG. 2 is an enlarged fragmentary cross-sectional view including the portion of FIG. 1 delineated by the lines 2—2;

FIG. 3 is a cross-sectional view partially in elevation of the coupling iris portion of the tube depicted in FIG. 1 taken along the lines 3—3 in the direction of the arrows;

FIG. 4 is a view of another embodiment of the novel tunable coupling iris portion of the present invention;

FIG. 5 is a cross-sectional view partially in elevation of the embodiment depicted in FIG. 4;

Figure 6A:
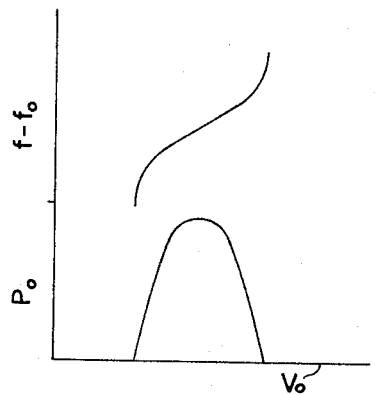
FIG. 6 depicts an illustrative graphical portrayal of frequency $f$ and power output, $P_o$ versus beam voltage $V_o$ for a two-cavity klystron oscillator under various coupling conditions.

Referring now to the drawings, and in particular to FIG. 1 there is depicted therein a novel two-cavity klystron oscillator device 10 extending along and defining a central axis including a collector portion 11 having a plurality of cooling fins 12 disposed at the downstream end of said device. At the upstream end of said oscillator, a conventional electron gun assembly 13 is vacuum sealed to the main body block 14 which forms a vacuum envelope and serves to define the exterior surfaces of cavities 15 and 16. Cavities are defined along the axial extent of said electron discharge device by means of header members 17, 18 and 19 which include re-entrant drift tube portions 20. A conventional radio frequency (R.F.) window assembly 21 is utilized to extract electromagnetic energy from the oscillator. Coupling between cavities 15 and 16 takes place through coupling iris 22. What has been described so far is simply a conventional two-cavity klystron oscillator.

The coupling iris 22, according to the features of the present invention, as mentioned in FIGS. 1–3, is tunable by means of a tuning mechanism 23 having a movable wall and capacitance probe 24, 25, respectively, as shown in the preferred embodiments of FIGS. 1–3. The tuner actuating mechanism 26 may advantageously include an anti-backlash feature according to the teachings set forth in U.S. Patent 3,104,340 by A. J. Fiedor et al., assigned to the same assignee as the present invention. Conventional materials and vacuum sealed joints may be employed throughout the tube as well as in the seal between the movable wall and diaphragm 24 and the tube main body 14 and probe 25.

The tunable coupling iris or coupling aperture depicted in FIGS. 1–3 is a re-entrant type of resonant iris arrangement which includes a capacitive probe 25 in conjunction with the movable wall of diaphragm 24 thus allowing, as will be explained in greater detail hereinafter, a fairly large amount of coupling change per unit movement of said movable wall and capacitance probe.

Turning now to FIGS. 4 and 5, another re-entrant embodiment of the novel tunable coupling iris concept of the present invention is depicted therein. Since the structure depicted in FIGS. 4 and 5 is, practically speaking, equivalent to that depicted in FIGS. 2 and 3, similar reference numerals have been employed for similar parts. As can be seen by examination of FIGS. 4 and 5, the drive rod 27 terminates flush with the exterior surface of the movable wall or diaphragm 24 and does not penetrate therethrough. The re-entrant condition for the embodiment depicted in FIGS. 4 and 5 is reversed with respect to the embodiment depicted in FIGS. 2 and 3. In other words the curved iris defining wall 29 of header 30 is the re-entrant portion in FIGS. 4 and 5 while the probe 25 is the re-entrant portion in the embodiment in FIGS. 1–3. The embodiment depicted in FIGS. 4 and 5 is not as effective as the embodiment depicted in FIGS. 1–3, but is much superior to a simple flat movable wall with no re-entrant or protruding portion. In other words the slight curvature of header 30 at the wall portion 29 is sufficient to provide a re-entrant coupling iris such that appreciable variation in coupling magnitude as well as iris resonant frequency is achieved for a small variation in gap spacing when using the corrugated diaphragm tuning wall 24 of FIGS. 4 and 5. Common to both the embodiments of FIGS. 1–3 and 4 and 5 is the novel concept of a multiple cavity klystron oscillator device having a tunable coupling iris, which facilitates the advantageous results set forth previously.

Figure 6B:
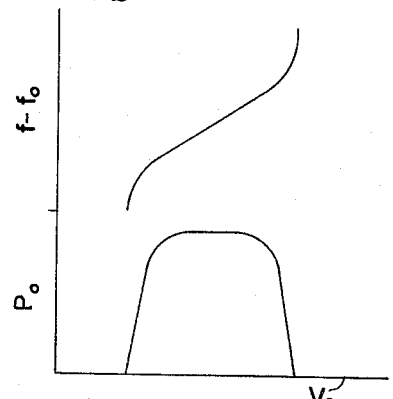
Figure 6C:
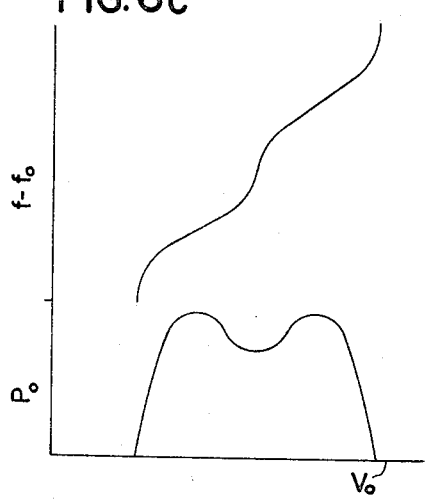
Figure 7:
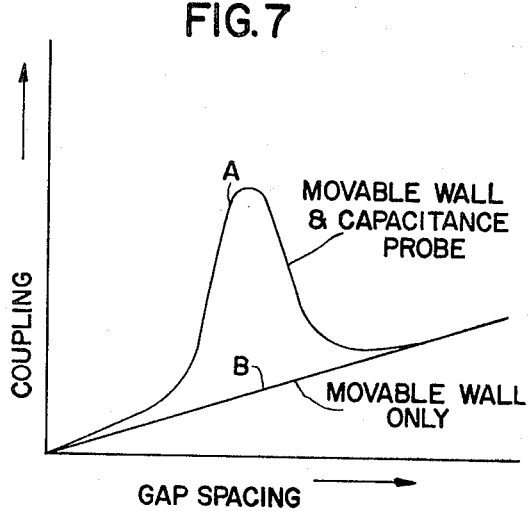
FIG. 7 is an illustrative theoretical graphical portrayal of coupling versus gap spacing for two different tunable coupling iris concepts.
Figure 8:
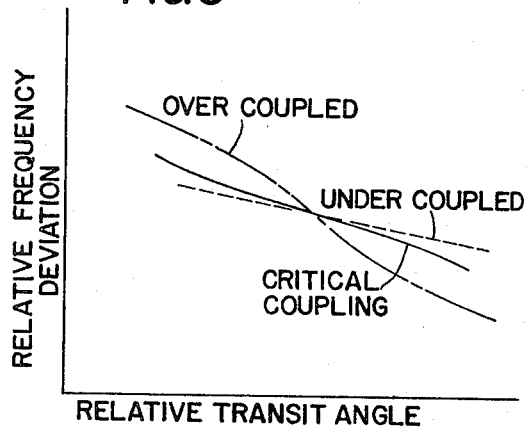
FIG. 8 is an illustrative graphical portrayal of modulation sensitivity, relative frequency deviation versus relative transmit angle, for various coupling conditions of a typical two cavity klystron oscillator.

In order to illustrate the more pertinent aspects of the present invention, illustrative graphical portrayals of FIGS. 6, 7, and 8 will now be referred to. Reference to Klystrons and Microwave Triodes, vol. 7, Radiation Laboratories Series, Louis N. Ridenour, editor in chief, by Donald Hamilton et al., first edition, 1948, pages 294–310, will provide an excellent discussion of the various modes and operating conditions for two-cavity klystron oscillators. In particular, FIGS. 11.9 and 11.10 of said work, depict a comparison between the maximum power output condition versus the uniform power output condition of operation or flat top mode characteristic. These conditions can be achieved in a single tunable tube by control of the coupling between the two cavities either by employing complex feedback control arrangements and/or by employing tunable external cavities. The present invention provides a simplified mechanism for achieving both said conditions in a tunable tube through the utilization of a tunable coupling iris between said two cavities which varies the coupling between the two cavities without substantially varying the resonant frequency of the cavities.

Reference to FIG. 6 depicts three conditions of operation for a two-cavity klystron oscillator utilizing different coupling conditions, namely, small or undercoupled (6A), optimum or critical (6B), excessive or overcoupled (6C) coupling. Each of the characteristics depicts frequency $f$ and power output $P_0$ versus beam voltage $V_0$. A particular characteristic which can be achieved in the present invention in a simplified manner is the optimum or critical condition wherein a flat top mode characteristics is obtained as evidenced by the power output $P_0$ versus beam voltage $V_0$ characteristic which is also essentially equivalent to a fairly small frequency deviation with respect to transit angle or reduced modulation sensitivity as shown more clearly in FIG. 8.

FIG. 7 is an illustrative theoretical graphical portrayal showing the amount of coupling change in relation to the physical movement achieved utilizing tunable coupling iris concepts as taught herein. Characteristic A depicts a typical coupling characteristic for the re-entrant tunable coupling iris embodiment of FIGS. 1–3. Characteristic B depicts a graphical approximation for a simple movable wall non re-entrant embodiment not shown in the drawing. As evidenced by characteristic A, a large change in coupling through the iris is achieved with a relatively small amount of physical movement for the re-entrant embodiment.

This rather extensive change in coupling for a small physical movement is achieved by virtue of a capacitive center probe utilized in conjunction with the movable diaphragm which enables the iris to be tuned to a resonant condition within the operating band of the oscillator while simultaneously providing the required coupling magnitude. Thus, a variation of said tunable coupling iris on either side of said resonant condition will provide a fairly large change in the coupling characteristic for a small physical movement due to the rapid variation in the resonant frequency of said iris. The reversed re-entrant tunable iris depicted in FIGS. 4 and 5 is a little less desirable from a standpoint of achieving a fairly large change in coupling for a unit physical movement of said diaphragm. However, an appreciable amount of coupling change can be achieved through physical movement of the diaphragm 24 either toward the curved facing wall 29 or away therefrom. It is to be noted that due to the absence of a radial probe type re-entrant portion such as the capacitive probe portion in FIGS. 1–3, the variation in coupling for the curved re-entrant embodiment of FIGS. 4 and 5 is not as great as the variation in coupling per unit movement of the diaphragm and capacitive probe embodiment of FIGS. 1–3. Suffice it to say however, that the physical and constructional benefits from a material standpoint derived from the re-entrant embodiments of FIGS. 1–5 are self-evident in terms of long diaphragm life and ease of adjustment of the coupling between two cavities.

Reference to FIGS. 11.16 to 11.21 of the aforementioned Radiation Laboratory Series volume, pp. 306–309, show the interrelationship between coupling, relative electron transit angle, relative frequency deviation, etc., and other characteristics of a two-cavity klystron oscillator. It is to be noted that the conditions for reduced modulation sensitivity while maintaining fair efficiency of operation and the condition for constant power output or a flat top mode condition are practically speaking, identical with regard to the amount of coupling required. Namely, the critical coupling condition for reducing the deviation in frequency with regard to relative transit angle which is a function of the beam voltage are, practically speaking, the same as the coupling conditions required to minimize deviation in power output with the beam voltage. The novel tunable coupling iris embodiments of the present invention permit achievement of both modes of operation in a simplified manner with a reduction in extensive cut and try experimental analysis prior to building of a production model tube. Furthermore, it is quite evident that, both from a frequency standpoint and from a power output standpoint, the tunable coupling iris concept of the present invention allows a wide variation in operating conditions for a two-cavity klystron oscillator to be achieved in a greatly simplified manner in a single two-cavity oscillator, thus providing the user with a single tube which is easily capable of multiple usage. The wide variations in iris resonant frequency for any given median design level of coupling magnitude which are achieved by the re-entrant versions of the present invention are particularly advantageous in designing an entire line of two-cavity oscillators which have common design features. This control of the median level of coupling while still retaining a wide variation in coupling about the selected median level is a direct result of the re-entrant aspects of the tunable coupling iris.

When the tunable coupling iris concept of the present invention is utilized in conjunction with an individually tunable two-cavity klystron embodiment, enhanced freedom of design is given to the tube engineer with regard to the operation of a two-cavity klystron oscillator at any one of various operating conditions which, of course, are determined by the system's user. The economic advantages of such flexibility of design are self-evident. Furthermore, it is to be noted that conventional materials such as Monel, may be used for the diaphragm and a copper probe is advantageously employed for the capacitance or re-entrant portion of the tunable iris depicted in FIGS. 1 and 3. The advantages resulting from less sensitivity to power supply fluctuations inherent in the flat top mode characteristic and which characteristic can easily be achieved through the utilization of the tunable coupling iris of the present invention are self-evident.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A high frequency electron discharge device including at least two resonant cavities successively coupled to a beam of electrons traversing both cavities, a coupling iris communicating between said cavities and lying in a wall interposed between said two cavities, said coupling iris having a first wall and a second wall facing said first wall, said first wall being so formed as to have at least a portion thereof spaced closer to said second wall than the remaining portion of said first wall to form a capacitive gap therebetween, one of said walls being movable toward the other of said walls to vary the length of said gap to tune said iris.

2. The device as defined by claim 1 wherein said first wall is convexly curved.

3. The device as defined by claim 2 wherein said second wall comprises a movable diaphragm.

4. The device as defined by claim 3 further including screw means operatively connected to said diaphragm to move said diaphragm to tune said iris.

5. The device according to claim 1 wherein said first wall is provided with a capacitive probe member extending toward said second wall.

6. The device according to claim 5 wherein said first wall comprises a movable diaphragm through which said probe extends.

7. A high frequency electron discharge device including a vacuum envelope, at least two resonant cavities within said envelope, means forming a beam of electrons traversing said resonant cavities, said cavities being successively coupled to said beam of electrons, a tunable coupling iris providing wave energy communication between said cavities, said coupling iris including a movable wall which forms part of the vacuum envelope of said device, said movable wall being provided with a capacitive probe means extending within said iris to tune said iris in response to movement of said movable wall, and screw means on said vacuum envelope to move said movable wall.

References Cited

UNITED STATES PATENTS 2,304,186   12/1942   Litton _____ 315—5.48 X

FOREIGN PATENTS 878,920   11/1942   France.

HERMAN KARL SAALBACH, *Primary Examiner.*

PAUL L. GENSLER, *Examiner.*